United States Patent
Oh et al.

(10) Patent No.: US 7,131,016 B2
(45) Date of Patent: Oct. 31, 2006

(54) METHOD AND APPARATUS FOR ADJUSTING CLOCK THROTTLE RATE BASED ON USAGE OF CPU

(75) Inventors: Jang Geun Oh, Kyunggi-Do (KR); Sang Ho Lee, Seoul (KR)

(73) Assignee: Microconnect LLC, Chicago, IL (US)

( * ) Notice: Subject to any disclaimer, the term of this patent is extended or adjusted under 35 U.S.C. 154(b) by 296 days.

(21) Appl. No.: 09/850,059

(22) Filed: May 8, 2001

(65) Prior Publication Data

US 2001/0044909 A1    Nov. 22, 2001

(30) Foreign Application Priority Data

May 15, 2000    (KR) ................ 2000-25787

(51) Int. Cl.
*G06F 1/32*    (2006.01)
*G06F 1/26*    (2006.01)

(52) U.S. Cl. ................ 713/322; 713/300; 713/320; 713/322; 713/323; 713/324; 718/100; 718/104; 718/108; 702/182; 714/47; 714/814; 710/18; 710/19

(58) Field of Classification Search ................ 713/320, 713/322, 600, 300, 323, 324; 718/100, 104, 718/108; 702/182; 710/18, 19; 714/47, 714/814

See application file for complete search history.

(56) References Cited

U.S. PATENT DOCUMENTS

| | | | | |
|---|---|---|---|---|
| 5,167,024 | A | 11/1992 | Smith et al. | 395/375 |
| 5,239,652 | A | 8/1993 | Seibert et al. | 395/750 |
| 5,475,848 | A * | 12/1995 | Ikeda | 713/322 |
| 5,511,205 | A | 4/1996 | Kannan et al. | 395/750 |
| 5,537,656 | A * | 7/1996 | Mozdzen et al. | 713/323 |
| 5,586,332 | A | 12/1996 | Jain et al. | 395/750 |
| 5,590,341 | A | 12/1996 | Matter | 395/750 |
| 5,623,647 | A * | 4/1997 | Maitra | 713/501 |
| 5,719,800 | A | 2/1998 | Mittal et al. | 364/707 |
| 5,754,436 | A * | 5/1998 | Walsh et al. | 713/300 |
| 5,761,517 | A | 6/1998 | Durham et al. | 395/750.04 |
| 5,768,602 | A | 6/1998 | Dhuey | 395/750.04 |
| 5,784,628 | A | 7/1998 | Reneris | 395/750.01 |
| 5,787,294 | A * | 7/1998 | Evoy | 713/320 |
| 5,797,115 | A * | 8/1998 | Fuller | 702/186 |
| 5,812,860 | A | 9/1998 | Horden et al. | 395/750.04 |
| 5,825,674 | A * | 10/1998 | Jackson | 713/321 |
| 5,983,357 | A * | 11/1999 | Sun | 713/324 |
| 6,029,119 | A | 2/2000 | Atkinson | 702/132 |
| 6,076,171 | A * | 6/2000 | Kawata | 713/501 |
| 6,079,025 | A * | 6/2000 | Fung | 713/323 |
| 6,198,245 | B1 | 3/2001 | Du et al. | 318/471 |
| 6,216,235 | B1 | 4/2001 | Thomas et al. | 715/501 |
| 6,219,723 | B1 | 4/2001 | Hetherington et al. | 710/18 |

(Continued)

FOREIGN PATENT DOCUMENTS

JP    10143274 A  *  5/1998

(Continued)

*Primary Examiner*—Lynne H. Browne
*Assistant Examiner*—Nitin C. Patel
(74) *Attorney, Agent, or Firm*—Fleshner & Kim, LLP

(57) ABSTRACT

A method, apparatus or stored program for adjusting the clock throttle rate of a central processing unit (CPU) included in a computer, in which the usage of the CPU is measured, so that the clock throttle rate of the CPU can be automatically adjusted on the measured usage of the CPU, thereby reducing the consumption of electric power without any influence on the performance of the computer.

37 Claims, 4 Drawing Sheets

U.S. PATENT DOCUMENTS

| | | | |
|---|---|---|---|
| 6,272,642 B1 | 8/2001 | Pole, II et al. | 713/300 |
| 6,298,448 B1 * | 10/2001 | Shaffer et al. | 713/322 |
| 6,384,651 B1 | 5/2002 | Horigan | 327/175 |
| 6,397,340 B1 * | 5/2002 | Watts et al. | 713/322 |
| 6,415,388 B1 * | 7/2002 | Browning et al. | 713/322 |
| 6,446,214 B1 | 9/2002 | Chrysanthakopoulos | 713/310 |
| 6,564,328 B1 * | 5/2003 | Grochowski et al. | 713/320 |
| 6,601,179 B1 | 7/2003 | Jackson et al. | 713/322 |
| 6,684,341 B1 * | 1/2004 | Malcolm et al. | 713/320 |
| 6,694,442 B1 * | 2/2004 | Yeh | 713/322 |
| 6,823,516 B1 * | 11/2004 | Cooper | 718/108 |
| 2003/0045237 A1 * | 3/2003 | Gardner et al. | 455/63 |

FOREIGN PATENT DOCUMENTS

KR  90-5435  3/1990

* cited by examiner

METHOD AND APPARATUS FOR ADJUSTING CLOCK THROTTLE RATE BASED ON USAGE OF CPU

BACKGROUND OF THE INVENTION

1. Field of the Invention

The present invention relates to a method and apparatus for adjusting the clock throttle rate of a central processing unit (CPU) included in a computer.

2. Background of the Related Art

A computer (or "system") 4, as illustrated in FIG. 1A, is commonly used with external output devices, such as a display monitor 6 and a printer 12, as well as external input devices, such as a keyboard 8 and a mouse 10. The power management of a system 4 is often controlled by external input devices.

A power management method in the related art will be described in conjunction with FIG. 1 which illustrates a related method for managing the electric power consumed in a system. Once the system is turned on (Step S10), the system 4 determines whether a signal has been inputted from an external input device, such as a keyboard or mouse, to the system for a predetermined period of time (Step S11). If there is a signal inputted from the external input device within a predetermined period of time, the system is maintained in its ON state. On the other hand, if no signal is inputted from the external input device for the predetermined period of time, the system is switched from its ON state to an idle mode (Step S12) to reduce the electric power consumed in the system.

In systems where an advanced power management (APM) is applied, the operational mode when no signal is inputted from the external input device for a certain period of time is referred to as an "idle mode" or "doze mode". When the system is switched to the "idle mode", the basic input/output system (BIOS) of the system conducts an operation for reducing the clock speed supplied to the CPU and decreasing LCD brightness, etc., thereby reducing the consumption of electric power.

For instance, a dedicated power management chipset such as an Intel PIIX4E power management chipset is mainly used as a means for conducting the above mentioned APM power management operation. Typically, this power management chipset adjusts the clock throttle rate of the CPU among 7 different levels of 12.5%, 25%, 37.5%, 50%, 62.5%, 75%, and 87.5%. That is, assuming that the maximum speed of the CPU corresponds to 100%, the clock throttle rate of the CPU can be stepwise adjusted in a range from 100% to 12.5% at a reduction rate of 12.5% per step using the dedicated power management chipset (Intel PIIX4E).

In order to control the clock rate of the CPU, a clock throttle operation is also carried out by controlling desired registers of the power management chipset (Intel PIIX4E). A user controls desired registers to adjust the set-up of the BIOS to enable an idle mode supporting item and the clock rate of the CPU selects one of 7 different levels designated by the BIOS of the system, typically, 50%.

Meanwhile, in a system where an advanced configuration and power interface (ACPI) is applied and the system is in a state of use by an application program, the system sets the CPU at a clock throttle rate of 100% and the switching of the system to an "idle mode" by the BIOS of the system is not carried out. On the other hand, when the CPU is not being used by an application program, the system conducts a power management operation setting the CPU to a lower clock throttle rate.

However, the above mentioned power management methods of the related art have problems. In the case of the system to which the APM is applied, the clock throttle rate is reduced to a predetermined rate (typically, 50%) only when the system is switched from its ON state to an idle state. For this reason, there is a problem in that no power management is carried out in the ON state of the system.

Furthermore, although it is not necessary to use external input devices when operating a digital video disk (DVD) or a video file to allow the user to watch a movie or a program broadcasted on the Internet, the system should be in the ON state because the system remains in operation. In this case, however, the system may maintain or switch into the idle state because of a lack of external input by the user, thus resulting in slower or intermittent reproduction of the data.

In the case of the system to which the ACPI is applied, it is possible to conduct power management while the system is in the ON state. However, the power management is very simple, in that clocks are operated at a clock throttle rate of 100% in the operating state of the CPU, but the clocks are cut off in the non-operating state of the CPU. In accordance with such a very simple power management, clocks are supplied to the CPU at a maximum clock throttle rate even in a situation in which an application program involving a less CPU usage is used. For this reason, an increased consumption of electric power occurs unnecessarily in the system.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Therefore, an object of the invention is to provide a method for adjusting the clock throttle rate of a CPU in a system, in which the usage of the CPU is measured, so that the clock throttle rate of the CPU can be adjusted in a stepwise fashion, based on the measured usage of the CPU, thereby allowing the CPU to be supplied with clocks at a rate necessary for the execution of a desired program without any influence on the performance of the system, and more particularly to a method for adjusting the clock throttle rate of a CPU included in a computer, in which the usage of the CPU is measured, so that the clock throttle rate of the CPU can be automatically adjusted, based on the measured usage of the CPU, thereby reducing the consumption of electric power without any influence on the performance of the computer.

Another object of the invention is to provide a method for adjusting the clock throttle rate of a CPU in a system, in which the usage of the CPU is measured, so that the clock throttle rate of the CPU can be adjusted in a stepwise fashion, based on the measured usage of the CPU, thereby reducing the consumption of electric power.

In order to accomplish these objects, the present invention provides a method for adjusting a clock throttle rate of a central processing unit (CPU), comprising measuring a usage of the CPU, comparing the measured CPU usage with a predetermined reference CPU usage range, and adjusting the clock throttle rate of the CPU, based on a result of the comparison. The measurement of the CPU usage is carried out at every refresh time. The CPU usage is measured by calculating an idle thread value of the CPU for a predetermined period of time. The CPU usage is measured by detecting registry information of the system.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
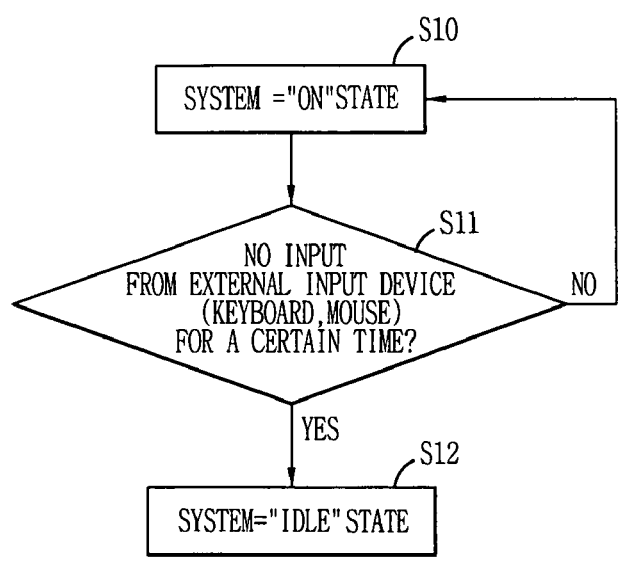
FIG. 1 is a flow chart illustrating a power management method in the related art used in a computer system.
Figure 2:
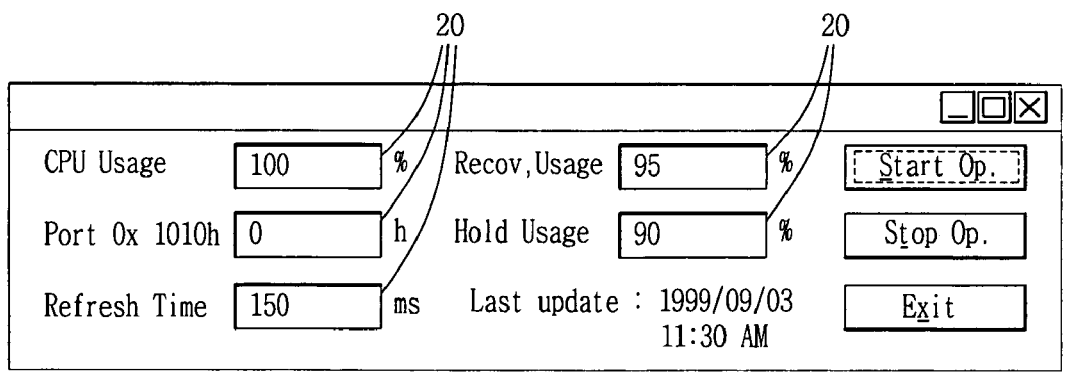
FIG. 2 illustrates the display window of an application program for carrying out a method for adjusting the clock throttle rate of a CPU in accordance with a preferred embodiment of the present invention.
Figure 1A:
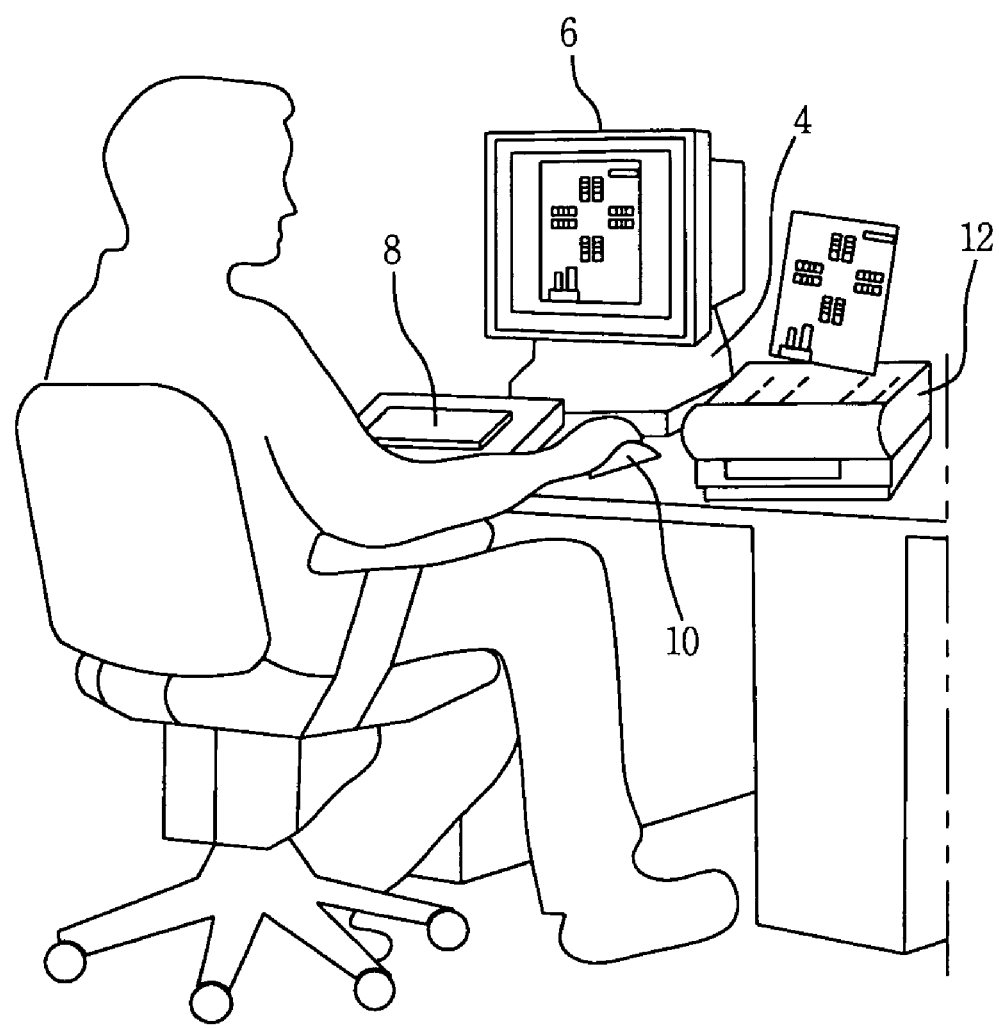
FIG. 1A illustrates a diagram of a computer system in the related art.

As shown in FIG. 2, the display window includes a plurality of sub-windows 20 for setting parameters required for the adjustment of the clock rate of a central processing unit (CPU), and menu bars. The sub-windows may, for example, include a sub-window "Hold Usage" representing a minimum reference usage of the CPU, a sub-window "Recov, Usage" representing a maximum reference usage of the CPU, a sub-window "CPU Usage" representing the current usage of the CPU, "Port 0x 1010h" representing an input/output register address, and "Refresh Time" representing a refresh time for refreshing the measurement of the CPU usage although other sub-windows may also be included.

In accordance with a preferred embodiment method of the present invention, desired parameters displayed on the display window are set to adjust the clock rate of the CPU at an environment setting step. For example, where the CPU usage is reduced to a value less than the minimum reference CPU usage set in the sub-window "Hold Usage" or set in a predetermined minimum reference CPU usage amount, the contents of those, which are associated with addresses 10H and 11H of input/output registers in a dedicated power management chipset (PIIX4E), that is, a register for determining a clock throttle rate and a register for enabling a clock throttle operation, are changed to reduce the clock rate of the CPU. Also, where the CPU usage is increased to a value more than the maximum reference CPU usage set in the sub-window "Recov, Usage" or set in a predetermined maximum reference CPU usage amount, the set register values are changed to increase the clock rate of the CPU. The CPU usage can be periodically measured at intervals of the refresh time set in the sub-window "Refresh Time" or at a predetermined interval of time that can be preset.

Figure 3:
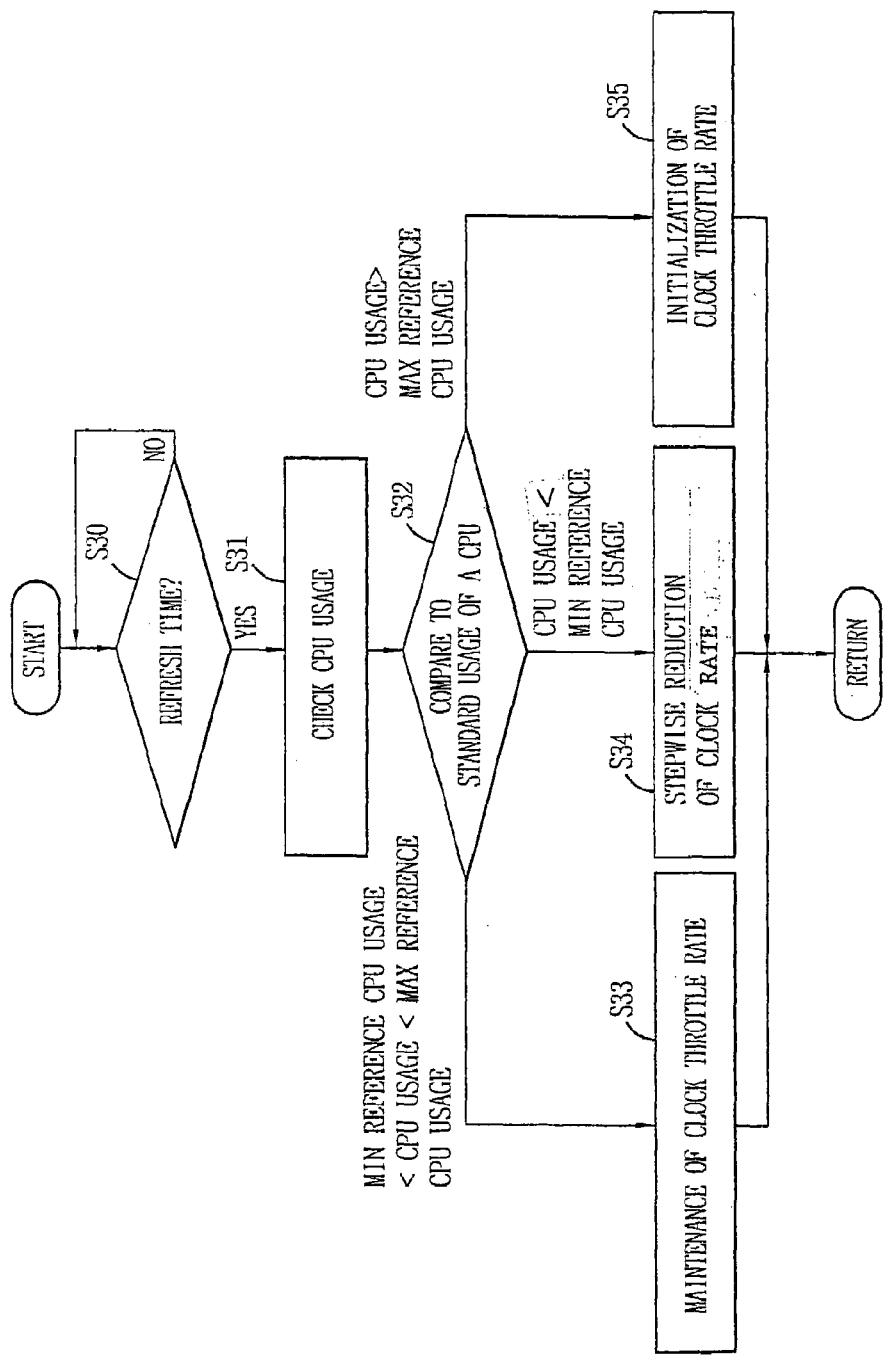
FIG. 3 is a flow chart illustrating the method for adjusting the clock throttle rate of the CPU in accordance with a preferred embodiment of the present invention.

FIG. 3 is a flow chart illustrating the method for adjusting the clock throttle rate of the CPU in accordance with a preferred embodiment of the present invention. In accordance with the method illustrated in FIG. 3, when the user enables a power management setting based on a CPU clock throttle rate adjustment, it is first determined whether the refresh time has elapsed (Step S30) and if the refresh time has elapsed, the usage of the CPU is measured (Step S31). The usage of the CPU may be measured by measuring an idle thread value of the CPU for a predetermined period of time or by detecting the CPU usage from the registry information of the system.

Thereafter, the measured CPU usage is compared with the minimum reference usage and maximum reference usage previously set using the display window of FIG. 2 (Step S32) or preset values. If the measured CPU usage is less than the minimum reference usage, the clock throttle rate of the CPU is stepwise increased, thereby reducing the clock rate of the CPU (Step S34). If the CPU usage measured after the reduction of the CPU clock throttle rate is still less than the minimum reference usage, the CPU clock throttle rate is then adjusted to a next higher value, thereby further reducing the clock rate of the CPU. This procedure is repeated until the measured CPU usage is not less than the minimum reference usage.

If the measured CPU usage is between the minimum and maximum reference usages, the current clock rate of the CPU is maintained as an optimum rate (Step S33). If the measured CPU usage is more than the maximum reference usage, the clock throttle rate of the CPU is initialized (Step S35) by recovering the clock rate of the CPU to a normal rate for improving system performance. The minimum and maximum reference usages may be appropriately determined, depending on the performance of the CPU.

Since the performance and power consumption of the system may vary considerably depending on the set values of the minimum and maximum reference usages, it may be desirable for those reference values to be set by the manufacturer rather than by the user. In this connection, it may be desirable to allow the user to determine whether it is necessary to enable the power management setting.

Figure 4:
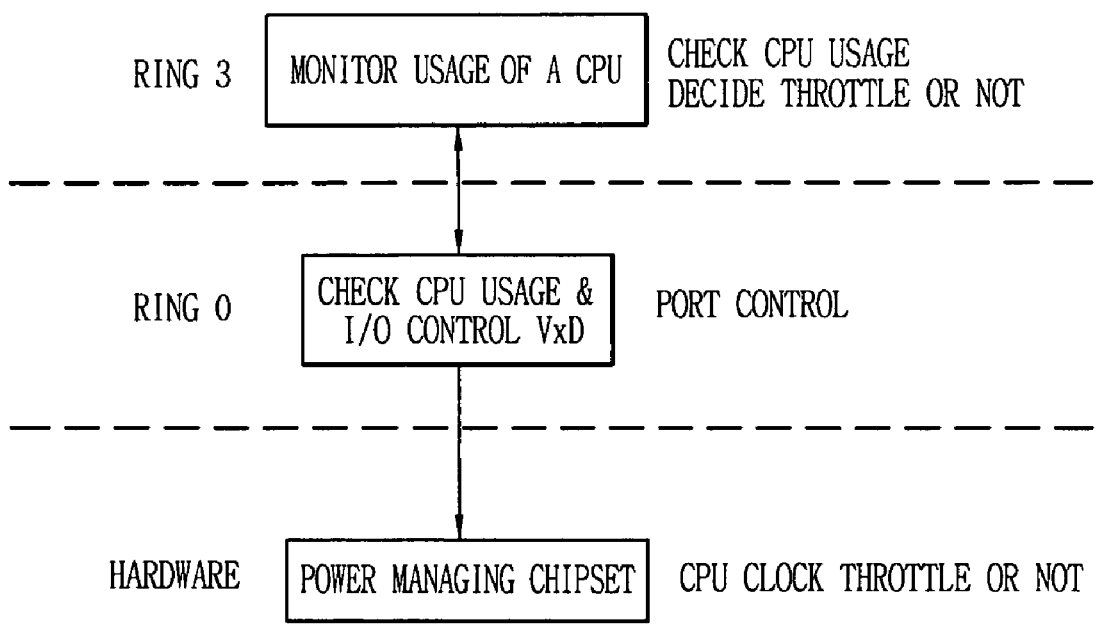
FIG. 4 is an architectural block diagram illustrating layers of an architecture configured in the system where a device driver is used.

As shown in FIG. 4, the architecture of the computer where a device driver is used includes a ring-3 layer, a ring-0 layer, and a hardware layer. The ring-3 layer is a user interface layer for enabling the clock throttle rate adjustment based on the usage of the CPU. The ring-0 layer is an intermediate layer that allows the user program to directly control the hardware layer with a device driver. When information set in the ring-3 layer is, transmitted to the device driver in accordance with an input/output control of the ring-0 layer, the device driver reads the usage of the CPU, thereby controlling the dedicated power management chipset to reduce or increase the clock throttle rate of the CPU.

As apparent from the above description, the present invention provides a method of preventing degradation in the performance of a system by measuring the usage of the CPU included in the system, and appropriately controlling the clock throttle rate of the CPU based on the measured CPU usage. The present invention also reduces the consumption of electric power in the system by measuring the usage of the CPU included in the system, and appropriately controlling the clock throttle rate of the CPU based on the measured CPU usage. Additionally, where the preferred method of the present invention is applied to a notebook computer, it is also possible to extend a life time of a battery used in the notebook computer.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for adjusting a speed of a central processing unit (CPU), comprising:
   measuring a usage of the CPU;
   comparing the measured CPU usage with a predetermined reference CPU usage range; and
   adjusting the speed of the CPU responsive to the comparison when the measured CPU usage is outside the predetermined reference CPU usage range, wherein if the measured CPU usage is more than a maximum reference CPU usage of the predetermined reference CPU usage range, then the adjustment of the CPU speed is carried out by initializing the CPU speed for recovering a high performance state.

2. The method according to claim 1, wherein the predetermined reference CPU usage range can be set either with or without a user's input.

3. The method according to claim 1, wherein if the measured CPU usage is less than a minimum reference CPU usage of the predetermined reference CPU usage range, then the adjustment of the CPU speed comprises reducing the CPU speed in a stepwise fashion.

4. The method according to claim 3, wherein the reduction of the CPU speed comprises adjusting the speed to a next lower speed.

5. The method according to claim 1, wherein if the measured CPU usage is between minimum and maximum reference CPU usages of the predetermined reference CPU usage range, then the adjustment of the CPU speed is carried out by maintaining current CPU speed.

6. The method according to claim 1, wherein if the measured CPU usage is more than the maximum reference CPU usage of the predetermined reference CPU usage range, then the initializing of the CPU speed is carried out by recovering the CPU speed, wherein the recovered CPU speed is a maximum CPU speed.

7. The method according to claim 1, wherein the CPU usage is measured by detecting registry information of a computer system.

8. The method according to claim 1, wherein the CPU usage is measured by calculating an idle thread value of the CPU for a predetermined period of time.

9. The method according to claim 1, wherein the measuring, comparing and adjusting steps are repeated in order at predetermined intervals of time.

10. The method according to claim 1, wherein the predetermined reference CPU usage range is set by an individual user of the CPU or the predetermined reference CPU usage range is preset.

11. The method according to claim 1, wherein the initialized CPU speed is obtained by initializing a throttle rate for the CPU speed to zero.

12. The method of claim 1, wherein if the measured CPU usage is less than a minimum reference CPU usage of the predetermined reference CPU usage range, then the adjustment of the CPU speed comprises reducing the CPU speed in a stepwise fashion, wherein the reduction of the CPU speed comprises adjusting the speed to a next lower speed, and wherein if the measured CPU usage is between minimum and maximum reference CPU usages of the predetermined reference CPU usage range, then the adjustment of the CPU speed is carried out by maintaining current CPU speed by performing no adjustment.

13. A computer, comprising:
   user interface means for enabling speed adjustment based on CPU usage;
   power management means for controlling a CPU's speed; and
   device driver means for reading CPU usage and controlling said power management means, wherein the device driver means comprises:
   a first circuit that measures a usage of the CPU,
   a second circuit that compares the measured CPU usage with a predetermined CPU usage range, and
   a third circuit that adjusts the speed of the CPU responsive to the comparison, wherein the speed of the CPU is directly set to a current operating maximum when the measured CPU usage is greater than the predetermined reference CPU usage range.

14. The computer according to claim 13, wherein the power management means automatically controls a register in a CPU to adjust the speed of the CPU.

15. The computer according to claim 13, wherein the device driver means comprises a ring-3 layer, a ring-0 layer and a hardware layer.

16. The computer according to claim 13, wherein the third circuit comprises:
   a first unit that reduces the speed if the measured CPU usage is less than a minimum reference CPU usage of the predetermined CPU range;
   a second unit that maintains the speed if the measured CPU usage is within the predetermined CPU usage range; and
   a third unit that recovers the speed if the measured CPU usage is more than a maximum reference CPU usage of the predetermined reference CPU usage range.

17. The computer according to claim 13, wherein the first circuit is configured to detect registry information of a computer system or calculate an idle thread value of the CPU for a predetermined period of time.

18. A stored program for machine implemented adjustment of a speed of a central processing unit (CPU), comprising:
   a first routine that measures a usage of the CPU;
   a second routine for comparing the measured CPU usage with a predetermined CPU usage range; and
   a third routine for adjusting the speed of the CPU, wherein the third routine comprises:
   a first subroutine for reducing the speed if the measured CPU usage is less than a minimum reference CPU usage of the predetermined CPU range,
   a second subroutine for maintaining the speed if the measured CPU usage is within the predetermined CPU usage range, and
   a third subroutine for recovering the speed if the measured CPU usage is more than a maximum reference CPU usage of the predetermined reference CPU usage range, wherein said third subroutine recovers said speed by setting the speed of the CPU to a maximum speed of the CPU.

19. The stored program according to claim 18, further comprising a fourth routine to repeat the first to third routines at predetermined intervals of time, wherein said maintaining the speed is performed by adjusting when the measured CPU usage is outside the predetermined CPU usage range.

20. The stored program according to claim 18, wherein the first routine comprises detecting registry information of a computer system or calculating an idle thread value of the CPU for a predetermined period of time.

21. The stored program according to claim 18, wherein the third subroutine initializes clock speed by setting a throttle rate to zero.

22. The stored program according to claim 18, wherein the predetermined reference CPU usage range is set by an individual user of the CPU.

23. A method for adjusting a speed of a central processing unit (CPU), comprising:
   measuring a usage of the CPU;
   comparing the measured CPU usage with a predetermined reference CPU usage; and
   adjusting the speed of the CPU in accordance with the comparing, wherein if the measured CPU usage is greater than the predetermined reference CPU usage, then the adjustment of the CPU speed is carried out by maximizing current CPU speed.

24. The method according to claim 23, wherein said maximizing is performed by initializing a clock throttle rate to zero.

25. The method according to claim 23, wherein said measuring comprises detecting registry information of a computer system or calculating an idle thread value of the CPU for a predetermined period of time.

26. A method for controlling a performance state of a central processing unit (CPU), comprising:
   measuring a usage of the CPU;
   comparing the measured CPU usage with a predetermined reference CPU usage range; and
   determining the performance state of the CPU responsive to the comparison, wherein if the measured CPU usage is outside the predetermined reference CPU usage range, then the determination of the CPU performance state includes changing the CPU performance state, wherein the CPU usage is measured by calculating an idle thread value of the CPU for a predetermined period of time.

27. The method according to claim 26, wherein the predetermined reference CPU usage range can be set either with or without a user's input.

28. The method according to claim 26, wherein if the measured CPU usage is between minimum and maximum reference CPU usages of the predetermined reference CPU usage range, then the determination of the CPU performance state is carried out by maintaining the CPU performance.

29. The method according to claim 26, wherein if the measured CPU usage is more than a maximum reference CPU usage of the predetermined reference CPU usage range, then the determination of the CPU performance state is carried out by initializing the CPU performance state for recovering high performance state.

30. The method according to claim 29, wherein the measuring, comparing and determining steps are repeated in order at predetermined intervals of time, wherein the high performance state is obtained by maximizing a current CPU speed.

31. The method according to claim 30, wherein the current CPU speed is maximized by initializing a clock throttle rate to zero.

32. The method according to claim 26, wherein the CPU usage is measured by detecting registry information of a computer system.

33. The method according to claim 26, wherein the predetermined reference CPU usage range is set by an individual user of the CPU or preset.

34. The method of claim 26, wherein if the measured CPU usage is less than a minimum reference CPU usage of the predetermined reference CPU usage range, then the adjustment of the CPU speed comprises reducing the CPU speed in a stepwise fashion, wherein the reduction of the CPU speed comprises adjusting the speed to a next lower speed, and wherein if the measured CPU usage is between minimum and maximum reference CPU usages of the predetermined reference CPU usage range, then the adjustment of the CPU speed is carried out by maintaining current CPU speed by performing no adjustment, and wherein if the measured CPU usage is more than a maximum reference CPU usage of the predetermined reference CPU usage range, then the adjustment of the CPU speed is carried out by recovering high performance operating CPU speed.

35. A method for controlling a performance state of a central processing unit (CPU), comprising:
   measuring a usage of the CPU;
   comparing the measured CPU usage with a predetermined reference CPU usage range; and
   adjusting the speed of the CPU responsive to the comparison when the measured CPU usage is outside the predetermined reference CPU usage range, wherein the CPU usage is measured by detecting registry information of a computer system.

36. The method of claim 35, wherein if the measured CPU usage is less than a minimum reference CPU usage of the predetermined reference CPU usage range, then the adjustment of the CPU speed comprises reducing the CPU speed in a stepwise fashion, wherein the reduction of the CPU speed comprises adjusting the speed to a next lower speed, and wherein if the measured CPU usage is between minimum and maximum reference CPU usages of the predetermined reference CPU usage range, then the adjustment of the CPU speed is carried out by maintaining current CPU speed by performing no adjustment, and wherein if the measured CPU usage is more than a maximum reference CPU usage of the predetermined reference CPU usage range, then the adjustment of the CPU speed is carried out by maximizing current CPU speed.

37. A method for adjusting a speed of a central processing unit (CPU), comprising:
   measuring a usage of the CPU;
   comparing the measured CPU usage with a predetermined reference CPU usage range; and
   adjusting the speed of the CPU responsive to the comparison when the measured CPU usage is outside the predetermined reference CPU usage range, wherein said measuring comprises calculating an idle thread value of the CPU for a predetermined period of time.

* * * * *